(12) United States Patent
Cheng et al.

(10) Patent No.: US 6,356,896 B1
(45) Date of Patent: Mar. 12, 2002

(54) DATA VISUALIZATION OF QUERIES OVER JOINS

(75) Inventors: Josephine Miu Cheng; Jyh-Herng Chow, both of San Jose; Michael Leon Pauser, Morgan Hill, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/375,259

(22) Filed: Aug. 16, 1999

(51) Int. Cl.[7] .............................................. G06F 17/30
(52) U.S. Cl. ........................... 707/4; 345/440; 345/775; 345/848
(58) Field of Search ............................. 707/10, 4, 5, 2, 707/3; 345/440, 775, 848; 705/10; 706/12; 382/162

(56) References Cited

U.S. PATENT DOCUMENTS

| | | | |
|---|---|---|---|
| 5,421,008 A | | 5/1995 | Banning et al. |
| 5,428,776 A | * | 6/1995 | Rothfield et al. ............... 707/4 |
| 5,808,612 A | * | 9/1998 | Merrick et al. ............. 345/351 |
| 5,894,311 A | * | 4/1999 | Jackson ...................... 345/440 |
| 5,956,720 A | * | 9/1999 | Fernandez et al. ............ 707/10 |
| 5,999,192 A | * | 12/1999 | Selfridge et al. ........... 345/440 |
| 6,151,601 A | * | 11/2000 | Papierniak et al. ........... 707/10 |

OTHER PUBLICATIONS

D.A. Keim, et al; Database Issues For Data Visualization, *IEEE Visualization*, (93 Workshop Proceedings, pp. 210–229, Berlin, Germany 1994).

* cited by examiner

Primary Examiner—John Breene
Assistant Examiner—Mohammad Ali
(74) Attorney, Agent, or Firm—Gates & Cooper LLP

(57) ABSTRACT

A method, apparatus, and article of manufacture for data visualization of queries over joins. One or more commands are executed in a computer to perform a database operation on a relational database stored on a data store connected to the computer. Initially, a selection of a join indicator associated with a row of a table in the relational database is received. It is determined whether to perform a table level join operation or a row level join operation. The determined join operation is performed.

30 Claims, 6 Drawing Sheets

FIG. 2

DEPARTMENT TABLE 200

| % | DEPT NUMBER | DEPT NAME |
|---|---|---|
| % | DRY | Database Technology Institute |
| % | WET | Application Technology Institute |

EMPLOYEE TABLE 220

| % | EMPLOYEE DEPARTMENT | EMPLOYEE NAME | EMPLOYEE ADDRESS |
|---|---|---|---|
| % | DRY | JO | XXX |
| % | WET | MICHAEL | YYY |
| % | DRY | JH | ZZZ |

PROJECT TABLE 240

| % | PROJECT DEPARTMENT | PROJECT NAME | PROJECT MEMBERS |
|---|---|---|---|
| % | WET | ABC | ... |
| % | WET | SRT | ... |
| % | WET | XYZ | ... |

FIG. 3

RESULT TABLE - TABLE LEVEL JOIN

| % | DEPT IDENTIFIER | DEPT NAME | EMPLOYEE DEPARTMENT | EMPLOYEE NAME | EMPLOYEE ADDRESS |
|---|---|---|---|---|---|
| % | DRY | Database Technology Institute | DRY | JO | XXX |
| % | DRY | Database Technology Institute | DRY | JH | ZZZ |
| % | WET | Application Technology Institute | WET | MICHAEL | YYY |

RESULT TABLE - ROW LEVEL JOIN

| % | EMPLOYEE DEPARTMENT | EMPLOYEE NAME | EMPLOYEE ADDRESS |
|---|---|---|---|
| % | DRY | JO | XXX |
| % | DRY | JH | ZZZ |

DATA VISUALIZATION OF QUERIES OVER JOINS

BACKGROUND OF THE INVENTION

1. Field of the Invention

This invention relates in general to database management systems performed by computers, and in particular, to data visualization of queries over joins.

2. Description of Related Art

Databases are computerized information storage and retrieval systems. A Relational Database Management System (RDBMS) is a database management system (DBMS) which uses relational techniques for storing and retrieving data. Relational databases are organized into physical tables which consist of rows and columns of data. The rows are formally called tuples. A database will typically have many physical tables and each physical table will typically have multiple tuples and multiple columns. The physical tables are typically stored on random access storage devices (RASD) such as magnetic or optical disk drives for semi-permanent storage. Additionally, logical tables or "views" can be generated based on the physical tables and provide a particular way of looking at the database. A view arranges rows in some order, without affecting the physical organization of the database.

RDBMS software using a Structured Query Language (SQL) interface is well known in the art. The SQL interface has evolved into a standard language for RDBMS software and has been adopted as such by both the American National Standards Institute (ANSI) and the International Standards Organization (ISO).

The SQL interface allows users to formulate relational operations on the tables either interactively, in batch files, or embedded in host languages, such as C and COBOL. SQL allows the user to manipulate the data. The definitions for SQL provide that a RDBMS should respond to a particular query with a particular set of data given a specified database content, but the method that the RDBMS uses to actually find the required information in the tables on the disk drives is left up to the RDBMS. Typically, there will be more than one method that can be used by the RDBMS to access the required data. The RDBMS will optimize the method used to find the data requested in a query in order to minimize the computer time used and, therefore, the cost of performing the query.

One SQL operation is a join operation. A join operation combines information from more than one table or view by appending information from one table or view to the information in the other. Rows or portions of rows from different tables or views are concatenated along the row (e.g., if a row of a first table contains "abc" and a row of a second table contains "xyz", the join results in a row containing "abc xyz"). The join operation is implied in a SQL statement (i.e., there is no join keyword) by selecting data from multiple tables. Typically, a join operation has the following form:

SELECT * FROM DEPARTMENT, EMPLOYEE
    WHERE DEPT_NUMBER=EMP_DEPT

The WHERE clause in the above SELECT statement indicates the columns (i.e., with DEPT_NUMBER and EMP_DEPT) through which the tables to be joined (i.e., DEPARTMENT and EMPLOYEE) are linked. DEPT_NUMBER is a primary key of the DEPARTMENT table, and EMP_DEPT is a foreign key of the EMPLOYEE table. A primary key and a foreign key, although having different names, contain the same information (i.e., department numbers), and so they can be used to link two tables.

When the join operation does not specify a conditional clause, the result is a Cartesian product, and the resulting table contains all possible combinations of rows from the joined tables. This result may contain redundant information.

The result of a join operation is typically a large, flat table that consists of rows from two tables. Some of the information may be redundant. Therefore, the join operation may result in a view of data that is not easily understood. Additionally, to join tables, current systems require that a user know of the tables that are to be joined. If a user does not know which tables may be joined, the user may not be able to perform useful join operations. Moreover, once a join is performed and the results of the join displayed, if a user wishes to perform another join or return to the original table, the user must submit another request. This may be time consuming and is not user-friendly.

Additionally, a variety of mobile devices such as PalmOS, Windows CE handheld devices, various embedded systems, and smart card, utilize a RDBMS for storing and retrieving data. These types of mobile devices have become very popular and are increasingly being used by a wide spectrum of people. Additionally, these mobile devices may contain a database. Unfortunately, these small devices have limited memory, a small display, and operate at slow speeds.

Because, the result of a join operation is typically a large, flat table and because some of the information may be redundant, the join operation may take up a great deal of memory in a small device, and, some joins may not be performed successfully. Moreover, due to the slower speed of the small device, performing a join operation on a small device is time consuming. Moreover, the flat structure is not easily displayed on a small device.

Therefore, there is a need in the art for improved data visualization for queries with joins.

SUMMARY OF THE INVENTION

To overcome the limitations in the prior art described above, and to overcome other limitations that will become apparent upon reading and understanding the present specification, the present invention discloses a method, apparatus, and article of manufacture for data visualization of queries over joins.

According to an embodiment of the invention, one or more commands are executed in a computer to perform a database operation on a relational database stored on a data store connected to the computer. Initially, a selection of a join indicator associated with a row of a table in the relational database is received. It is determined whether to perform a table level join operation or a row level join operation. The determined join operation is performed.

BRIEF DESCRIPTION OF THE DRAWINGS

Referring now to the drawings in which like reference numbers represent corresponding parts throughout:

FIG. 2 is a block diagram illustrating tables with join indicators that may be displayed by the data visualization system;

FIG. 3 is a block diagram illustrating a table that results from the data visualization system performing a table level join;

FIG. 4 is a block diagram illustrating a table that results from the data visualization system performing a row level join.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Hardware Environment

Figure 1:
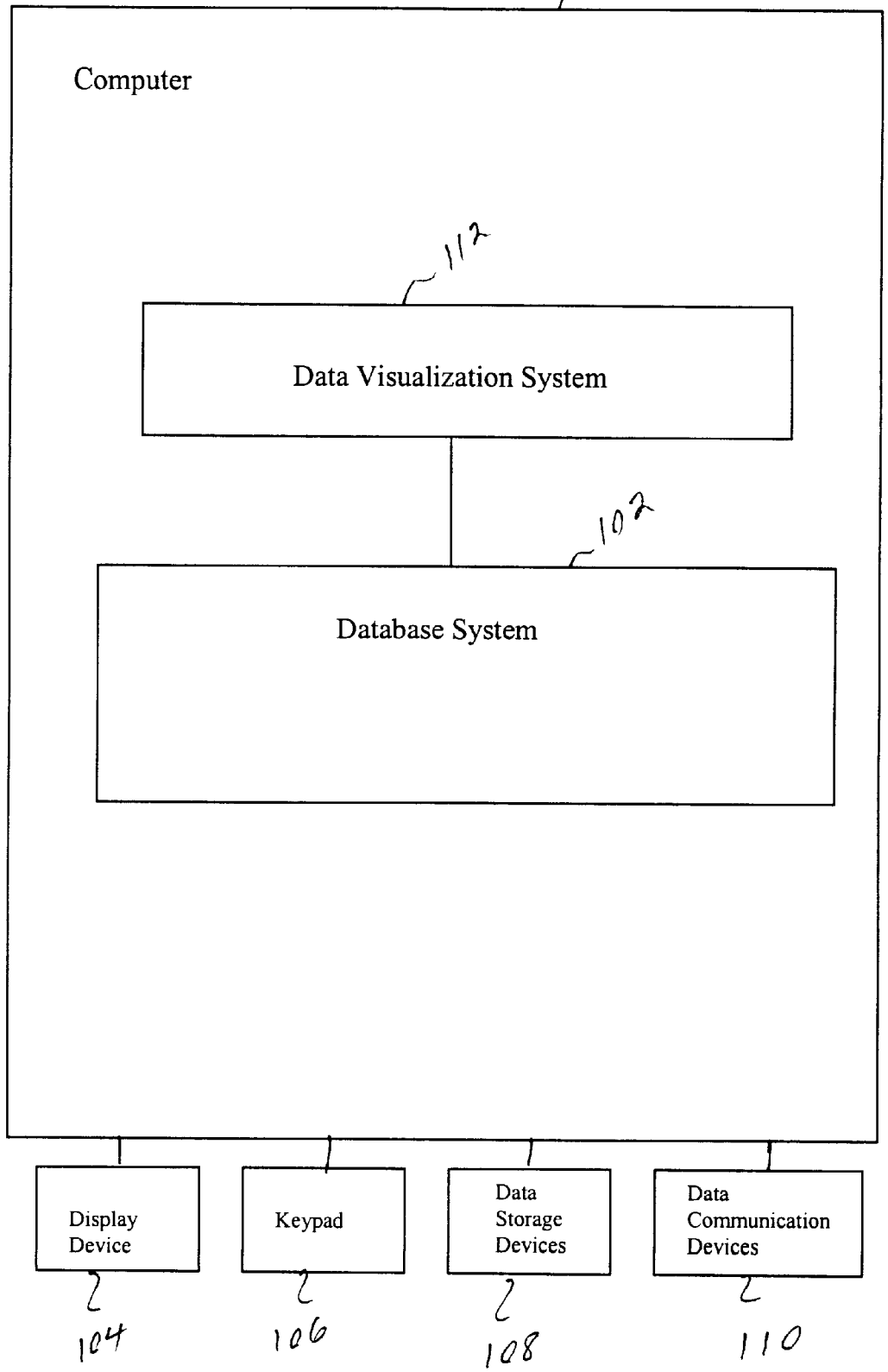
FIG. 1 is a hardware environment used to implement a preferred embodiment of the invention.

FIG. 1 illustrates an exemplary computer hardware environment that could be used in accordance with the present invention. In the exemplary environment, a computer system 100 represents a small device, such as a PalmOS or Windows CE handheld device. The computer 100 is comprised of one or more processors (not shown), a display device 104, a keypad 106, data storage devices 108, and data communication devices 110. The data storage devices 108 that store data for one or more relational databases may be a fixed or hard disk drive, a floppy disk drive, a CDROM drive, or other device. Additionally, the computer 100 contains a database system 102 and a data visualization system 112.

Operators of the computer system 100 submit commands for performing various search and retrieval functions, termed queries, against databases via the database system 102. In the present invention, these queries conform to the Structured Query Language (SQL) standard, and invoke functions performed by database software.

In the preferred embodiment of the present invention, the database software comprises DB2® Everywhere (i.e., a product from International Business Machines Corporation) for Windows CE and PalmOS. DB2® Everywhere enables users to access enterprise data from a variety of handheld devices. DB2® Everywhere is designed for mobile workers who need portable handheld deices for database applications. The data visualization system 112 works with the database system 102 to provide data visualization of queries with joins. Those skilled in the art will recognize that the present invention has application to any database software, whether or not the software uses SQL.

Generally, the data visualization system 112, other software, and the instructions derived therefrom, are all tangibly embodied in a computer-readable medium, e.g. one or more of the data storage devices 108. Moreover, the data visualization system 112, other software, and the instructions derived therefrom, are all comprised of instructions which, when read and executed by the computer system 100, causes the computer system 100 to perform the steps necessary to implement and/or use the present invention. Under control of an operating system, the data visualization system 112, other software, and the instructions derived therefrom, may be loaded from the data storage devices 108 into a memory of the computer system 100 for use during actual operations.

Thus, the present invention may be implemented as a method, apparatus, or article of manufacture using standard programming and/or engineering techniques to produce software, firmware, hardware, or any combination thereof The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Data Visualization of Queries over Joins

An embodiment of the invention provides a data visualization system 112 that provides a user-friendly approach to improving the data visualization of queries involving joins. In particular, the data visualization system 112 provides a technique for visualizing data in a table that may be joined to data in one or more other tables. That is, when the result of a SELECT from a table is displayed, if the table has any relationship with any other tables (e.g., such as having a primary key—foreign key relationship or having the same column name with the same column type as another table), the data visualization system 112 displays a join indicator for each row to indicate that this table has this property. When the join indicator is selected, the data visualization system 112 displays a list of tables having a relationship with the displayed table. Then, if a table is selected, the data visualization system 112 performs a join. The join may be a table level join or a row level join, which will be discussed in further detail below. Additionally, the data visualization system 112 provides a technique for moving back to the original table from the resulting joined table or for performing another join from a table resulting from a row level join.

Initially, when a table is referenced in a select statement, the data visualization system 112 identifies tables that may potentially be joined. The data visualization system 112 may perform this identification in several ways. For example, the data visualization system 112 may identify tables to be joined by reviewing primary and foreign keys that link tables. Also, the data visualization system 112 may collect user-specified information from a user via the keypad 106 and monitor 104. Moreover, the data visualization system 112 may search through the tables to identify a same column name and same column type for two columns of two tables, in which case, the data visualization system 112 recognizes that these tables may be joined.

Once the data visualization system 112 collects this information, the data visualization system 112 stores the information in memory 108 or some other data store. The information may be stored as a file, as a table, etc. Once stored, the data visualization system 112 can retrieve this information when the same table is referenced again.

Once this information has been stored (or retrieved in a case in which the same table is referenced again), the data visualization system 112 uses the information to display tables with join indicators. In one embodiment, the join indicator is a virtual column that is added to a table only when there is join data for that table. However, one skilled in the art would recognize that other join indicators, such as bolding rows that may be joined to other tables, may be used.

FIG. 2 is a block diagram illustrating tables with join indicators that may be displayed by the data visualization system 112. In particular, a DEPARTMENT TABLE 200 has a join indicator 202 that is a virtual column with a percent symbol ("%") used to indicate that the table or a row in the table may be joined to other tables. The use of a percent symbol as a join indicator 202 is used for illustration only, and other symbols or techniques may be used for the join indicator 202 without departing from the scope of the present invention.

Additionally, the DEPARTMENT TABLE 200 has columns for DEPT NUMBER 204 and DEPT NAME 206. The DEPARTMENT TABLE 200 has a primary key (i.e., DEPT NUMBER 204) to the foreign key (i.e., EMPLOYEE DEPARTMENT 224) of an EMPLOYEE TABLE 220. Additionally, the EMPLOYEE TABLE 220 has a join indicator 222 and columns for EMPLOYEE NAME 226 and EMPLOYEE ADDRESS 228. The DEPARTMENT TABLE 200 has a primary key (i.e., DEPT NUMBER 204) to the foreign key (i.e., PROJECT DEPARTMENT 224) of a PROJECT TABLE 240. Additionally, the PROJECT TABLE 240 has a join indicator 242 and columns for PROJECT NAME 246 and PROJECT MEMBERS 248.

The data visualization system 112 associates join identifiers in rows containing column names of a table and in rows containing column values of a table. When a join identifier associated with a row containing column names is selected, the data visualization system 112 provides a list of tables that may be joined to the table. If a table is selected from the list, the data visualization system 112 joins the original table with the selected table. When a join identifier associated with a row containing column values is selected, the data visualization system 112 provides a list of tables that may be joined to the row. If a table is selected from the list, the data visualization system 112 joins the row with the selected table.

FIG. 3 is a block diagram illustrating a table that results from the data visualization system 112 performing a table level join. Referring back to FIG. 2, row 208 contains column names. If the join indicator 210 associated with row 208 were selected, the data visualization system 112 would provide a list of tables that indicated that the DEPARTMENT TABLE 200 could be joined to the EMPLOYEE TABLE 220 or the PROJECT TABLE 240. If the EMPLOYEE TABLE 220 were selected from the list of tables, the data visualization system 112 would join the DEPARTMENT TABLE 200 with the EMPLOYEE TABLE 220. The RESULT TABLE 300 in FIG. 3 is generated by the data visualization system 112 performing this join. In particular, the RESULT TABLE 300 contains the columns of both the DEPARTMENT TABLE 200 and the EMPLOYEE TABLE 220 and contains a row for each combination resulting from the table level join. The result of the table level join provides all of the employees who work in any of the departments. Additionally, the RESULT TABLE 300 contains a column of join indicators. If a join indicator in RESULT TABLE 300 is selected, the data visualization system 112 displays a list of tables that may be joined with that table (e.g., the PROJECT TABLE 240).

The data visualization system 112 also provides a technique for returning to the original table from a result table. The data visualization system 112 may provide, for example, a menu or command button that enables returning to the original table. For the example illustrated in FIG. 3, the data visualization system 112 might provide a command button for returning from the RESULT TABLE 300 to the DEPARTMENT TABLE 200.

FIG. 4 is a block diagram illustrating a table that results from the data visualization system 112 performing a row level join. Referring back to FIG. 2, row 212 contains column values. If the join indicator 214 associated with row 212 were selected, the data visualization system 112 would provide a list of tables that indicated that row 212 could be joined to the EMPLOYEE TABLE 220 or the PROJECT TABLE 240. If the EMPLOYEE TABLE 220 were selected from the list of tables, the data visualization system 112 would join row 212 with the EMPLOYEE TABLE 220. The RESULT TABLE 400 in FIG. 4 is generated by the data visualization system 112 performing this join. In particular, the RESULT TABLE 400 contains the columns of the EMPLOYEE TABLE 220. The result of the row level join provides all of the employees who work in the DRY department. Additionally, the RESULT TABLE 400 contains a column of join indicators. If a join indicator in RESULT TABLE 400 is selected, the data visualization system 112 displays a list of tables that may be joined with that table.

The data visualization system 112 also provides a technique for returning to the original table from the result table for the row level join. The data visualization system 112 may provide, for example, a menu or command button that enables returning to the original table. For the example illustrated in FIG. 4, the data visualization system 112 might provide a command button for returning from the RESULT TABLE 400 to row 212 in the DEPARTMENT TABLE 200.

Figure 5A:
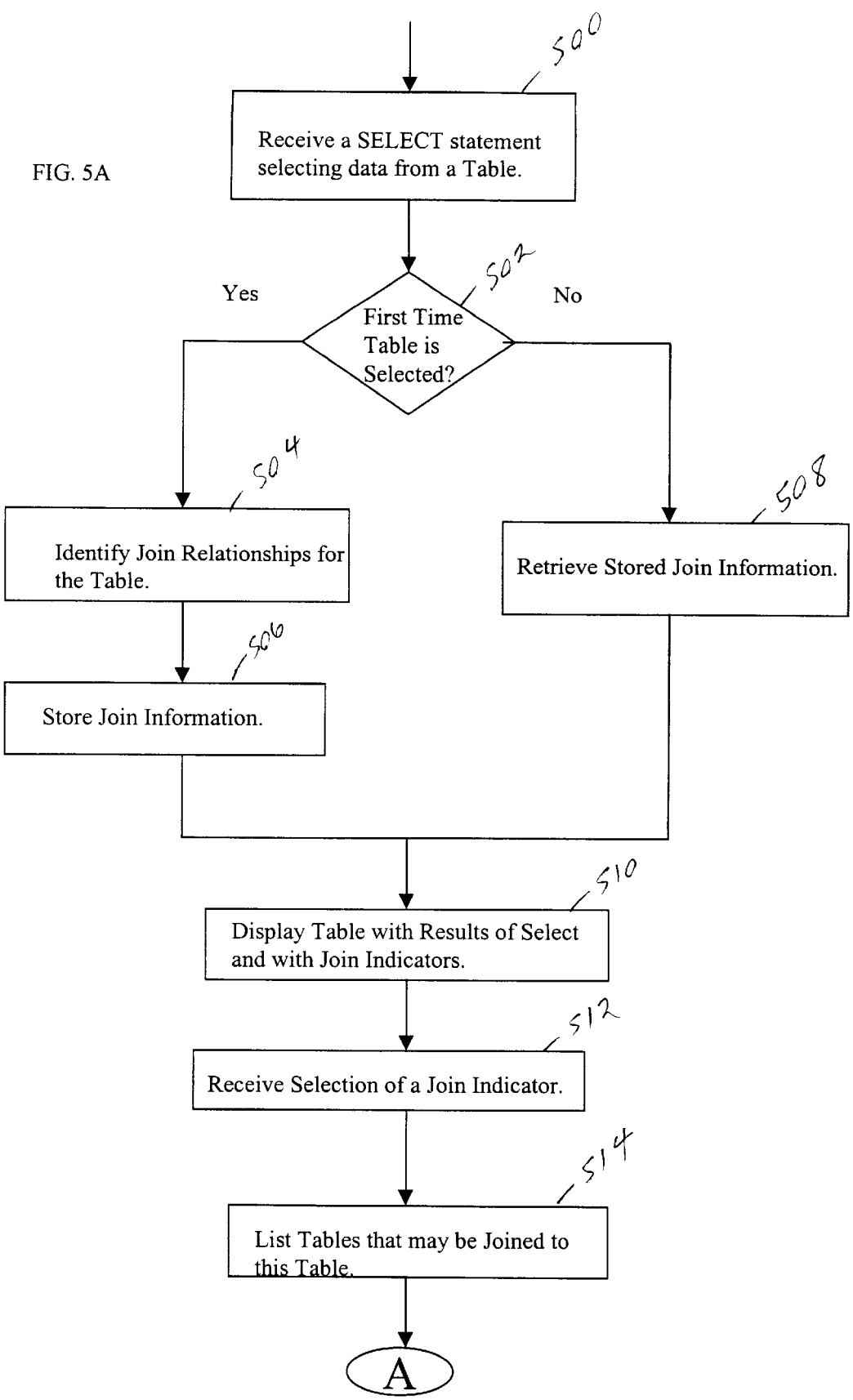
FIGS. 5A and 5B are flow diagrams illustrating the steps performed by the data visualization system to provide data visualization for queries with joins.
Figure 5B:
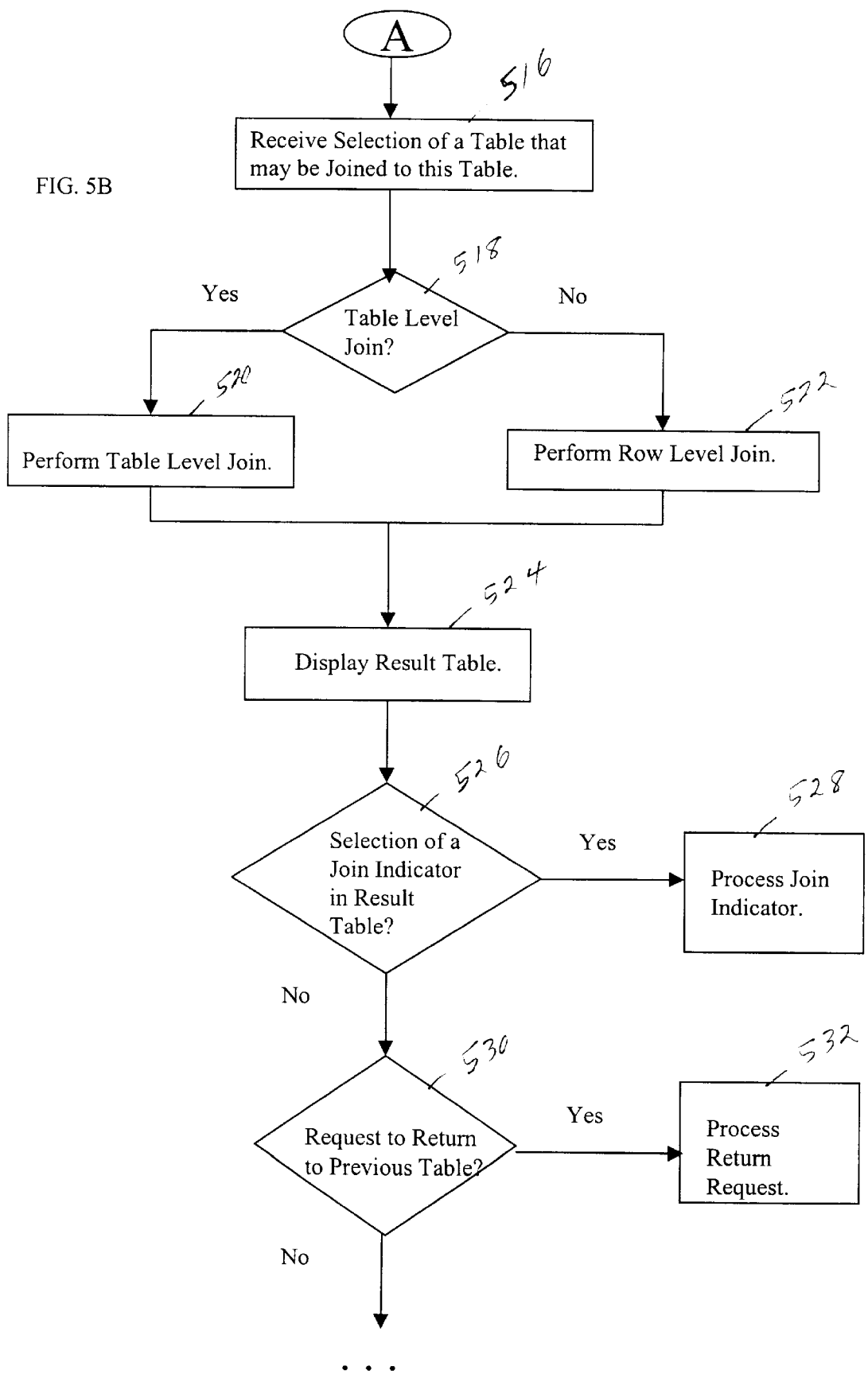
Figure 1:
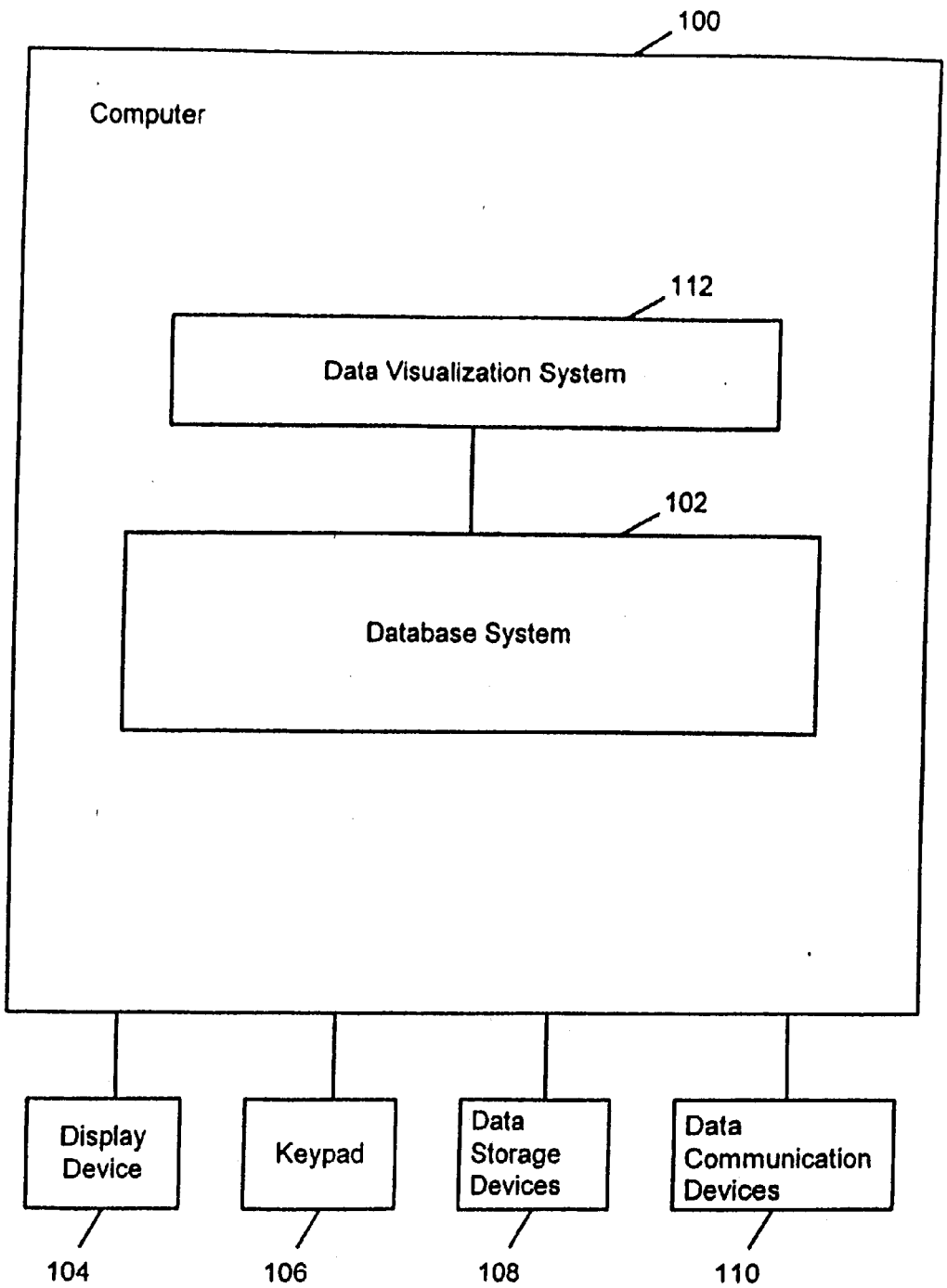
Figure 5A:
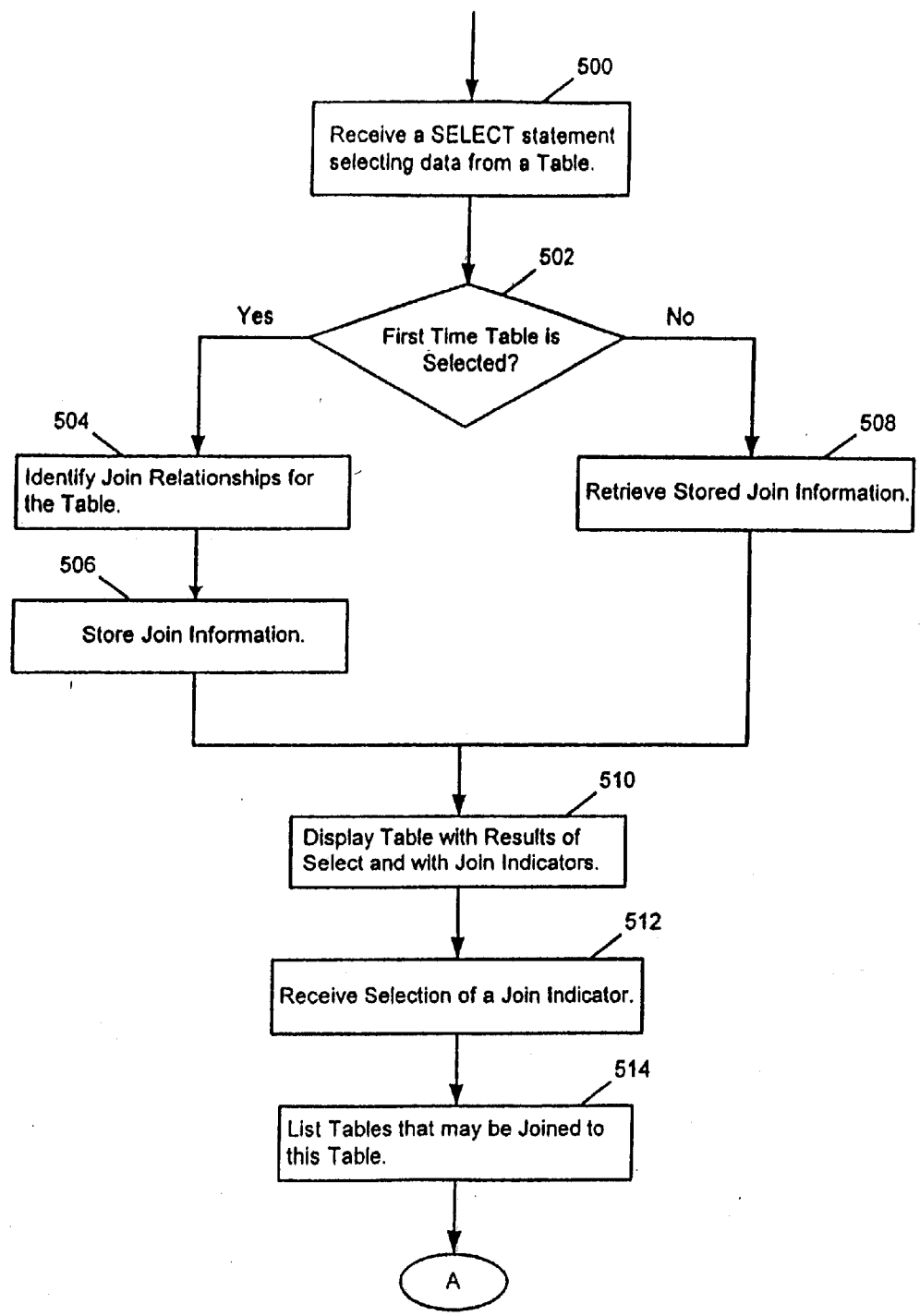
Figure 5B:
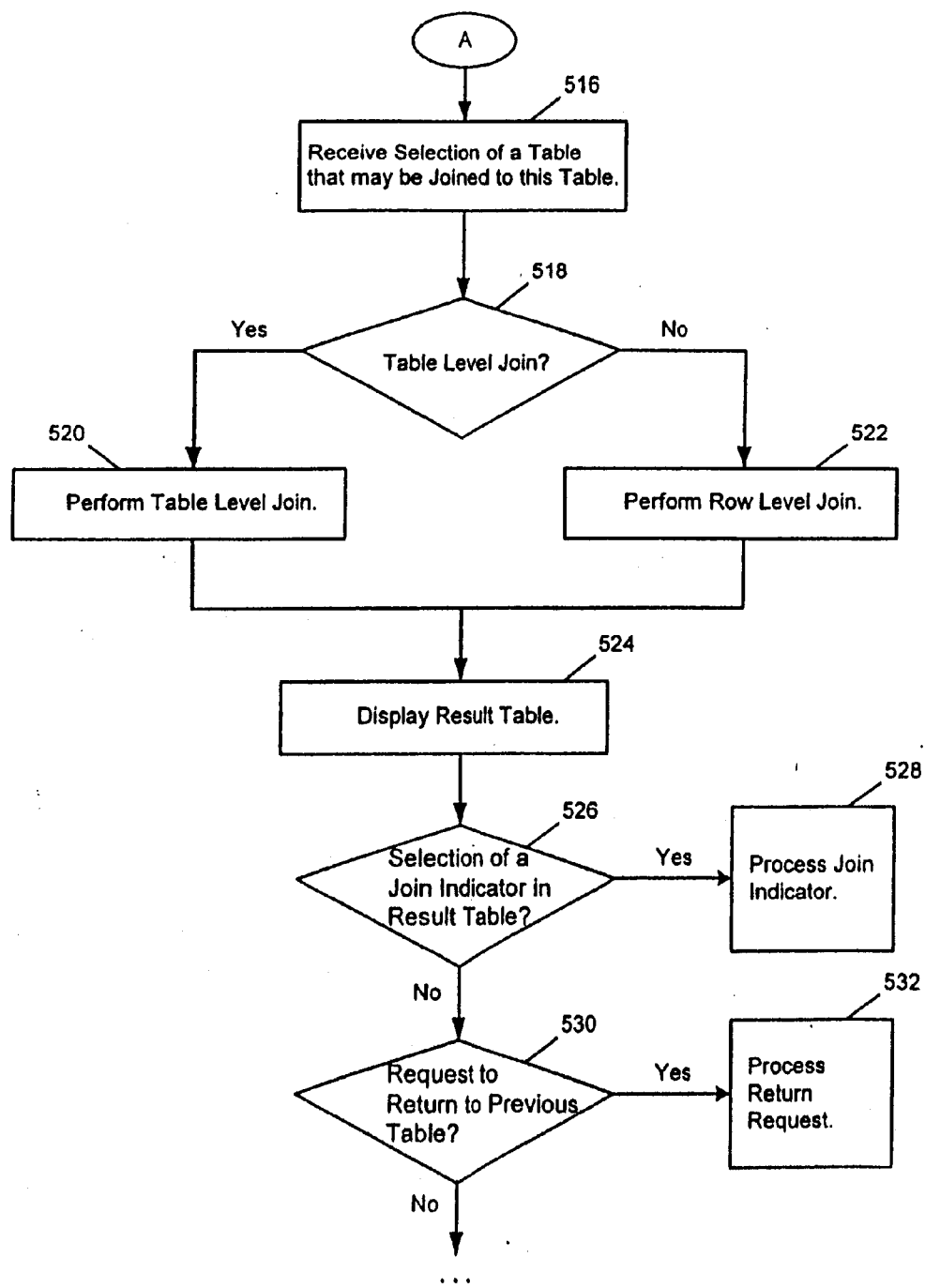

FIGS. 5A and 5B are flow diagrams illustrating the steps performed by the data visualization system 112 to provide data visualization for queries with joins. In block 500, the data visualization system 112 receives a select statement selecting data from a table. The use of selecting data from one table as discussed with reference to FIGS. 5A and 5B is submitted for illustration only; the techniques of the invention are applicable to other ways of accessing tables (e.g., statements other than a SELECT statement) and to accessing multiple tables, rather than just one table. For example, the following select statement may be received to select all rows from the DEPARTMENT table 200.

SELECT * FROM DEPARTMENT

In block 502, the data visualization system 112 determines whether this is the first time that this table has been referenced in a select statement. If this is the first time that this table has been referenced, the data visualization system 112 continues to block 504, otherwise, the data visualization system 112 continues to block 508. In block 504, the data visualization system 112 identifies join relationships for the table. In block 506, the data visualization system 112 stores join information (in a data store such as memory or a file) regarding the identified join relationships. On the other hand, in block 508, the data visualization system 112 retrieves stored join information for the table (which had been referenced at least once previously).

In block 510, the data visualization system 112 displays a table containing join indicators along with the rows selected as a result of performing the select. For example, for the above select statement, table 200 may be displayed. In block 512, the data visualization system 112 receives selection of a join indicator in the displayed table. In block 514, the data visualization system 112 lists tables that may be joined to the displayed table. In block 516, the data visualization system 112 receives selection of a table that may be joined to the displayed table.

In block 518, the data visualization system 112 determines whether the selected join indicator is for a table level join. If the selected join indicator is for a table level join, the data visualization system 112 continues to block 520, otherwise, the data visualization system 112 continues to block 522. In block 520, the data visualization system 112 performs a table level join. In block 522, the data visualization system 112 performs a row level join. In block 524, the data visualization system 112 displays a result table. If the result table is for a table level join, the result table contains columns from both joined tables, along with join indicators. If the result table is for a row level join, the result table contains join indicators along with columns from the table selected from the list of tables that may be joined to the original table.

In block 526, if a join indicator is selected in the result table, the data visualization system 112 continues to block 528, otherwise, the data visualization system 112 continues to block 530. In block 528, the data visualization system 112 processes the join indicator. In block 530, if a return to a previous (i.e., original) table is requested from the result table, the data visualization system 112 continues to block 532, otherwise, the data visualization system 112 continues with other processing, as represented by the ellipses. In block 532, the data visualization system 112 processes the return request and displays the original table.

CONCLUSION

This concludes the description of the preferred embodiment of the invention. The following describes some alternative embodiments for accomplishing the present invention. For example, any type of computer, such as a mainframe, minicomputer, personal computer, mobile device, or embedded system, or computer configuration, such as a timesharing mainframe, local area network, or standalone personal computer, could be used with the techniques of the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of executing one or more commands in a computer to perform a database operation on a relational database stored on a data store connected to the computer, the method comprising the steps of:
    identifying join relationships for a table in the relational database;
    using the identified join relationships to display the table with one or more join indicators;
    selecting one or more of the join indicators associated with a row of the displayed table;
    determining whether to perform a table level join operation or a row level join operation based on the selected join indicators; and
    performing the determined join operation.

2. The method of claim 1, wherein the step of determining further comprises the step of determining that the join indicator is associated with a row containing column names and further comprising the step of determining that a table level join operation is to be performed.

3. The method of claim 1, wherein the step of determining further comprises the step of determining that the join indicator is associated with a row containing column values and further comprising the step of determining that a row level join operation is to be performed.

4. The method of claim 1, wherein the step of identifying further comprises the step of identifying join relationships using a primary key and foreign key association.

5. The method of claim 1, wherein the step of identifying further comprises the step of identifying join relationships using user-provided information.

6. The method of claim 1, wherein the step of identifying further comprises the step of identifying join relationships by evaluating columns in different tables having a same column name and same column type.

7. The method of claim 1, wherein the computer is a mobile device.

8. The method of claim 1, further comprising the step of displaying a result table.

9. The method of claim 8, wherein the result table is displayed with join indicators.

10. The method of claim 8, wherein the result table is displayed with a return indicator.

11. An apparatus for executing one or more commands in a computer, comprising:
    a computer having a data store coupled thereto, wherein the data store stores a relational database; and
    one or more computer programs, performed by the computer, for identify join relationships for a table in the relational database, using the identified join relationships to display the table with one or more join indicators, selecting one or more of the join indicators associated with a row of the displayed table, determining whether to perform a table level join operation or a row level join operation based on the selected join indicators, and performing the determined join operation.

12. The apparatus of claim 11, wherein means for determining further comprises means for determining that the join indicator is associated with a row containing column names and further comprising means for determining that a table level join operation is to be performed.

13. The apparatus of claim 11, wherein means for determining further comprises means for determining that the join indicator is associated with a row containing column values and further comprising means for determining that a row level join operation is to be performed.

14. The apparatus of claim 11, wherein means for identifying further comprises means for identifying join relationships using a primary key and foreign key association.

15. The apparatus of claim 11, wherein means for identifying further comprises means for identifying join relationships using user-provided information.

16. The apparatus of claim 11, wherein means for identifying further comprises means for identifying join relationships by evaluating columns in different tables having a same column name and same column type.

17. The apparatus of claim 11, further comprising means for displaying a result table.

18. The apparatus of claim 17, wherein the result table is displayed with join indicators.

19. The apparatus of claim 17, wherein the result table is displayed with a return indicator.

20. The apparatus of claim 11, wherein the computer is a mobile device.

21. An article of manufacture comprising a program storage medium readable by a computer and embodying one or more instructions executable by the computer to perform method steps for executing one or more commands to perform a database operation on a relational database stored on a data store connected to the computer, the method comprising the steps of:
    identifying join relationships for a table in the relational database;
    using the identified join relationships to display the table with one or more join indicators;

selecting one or more of the join indicators associated with a row of the displayed table; determining whether to perform a table level join operation or a row level join operation based on the selected join indicators; and performing the determined join operation.

22. The article of manufacture of claim 21, wherein the step of determining further comprises the step of determining that the join indicator is associated with a row containing column names and further comprising the step of determining that a table level join operation is to be performed.

23. The article of manufacture of claim 21, wherein the step of determining further comprises the step of determining that the join indicator is associated with a row containing column values and further comprising the step of determining that a row level join operation is to be performed.

24. The article of manufacture of claim 21, wherein the step of identifying further comprises the step of identifying join relationships using a primary key and foreign key association.

25. The article of manufacture of claim 21, wherein to dingy further comprises the step of identifying join relationships using user-provided information.

26. The article of manufacture of claim 21, wherein the step of identifying further comprises the step of identifying join relationships by evaluating columns in different tables having a same column name and same column type.

27. The article of manufacture of claim 21, further comprising the step of displaying a result table.

28. The article of manufacture of claim 27, wherein the result table is displayed with join indicators.

29. The article of manufacture of claim 27, wherein the result table is displayed with a return indicator.

30. The article of manufacture of claim 21, wherein the computer is a mobile device.

* * * * *

UNITED STATES PATENT AND TRADEMARK OFFICE
CERTIFICATE OF CORRECTION

PATENT NO.    : 6,356,896 B1
DATED         : March 12, 2002
INVENTOR(S)   : Josephine Miu Cheng et al.

It is certified that error appears in the above-identified patent and that said Letters Patent is hereby corrected as shown below:

Delete title page and substitute with attached title page.

Delete FIGS. 1, 2, 3, 4, 5A and 5B, and substitute therefor FIGS. 1, 2, 3, 4, 5A and 5B, as shown on the attached pages.

Signed and Sealed this

Twenty-sixth Day of August, 2003

JAMES E. ROGAN
*Director of the United States Patent and Trademark Office*

(12) United States Patent
Cheng et al.

(10) Patent No.: US 6,356,896 B1
(45) Date of Patent: Mar. 12, 2002

(54) DATA VISUALIZATION OF QUERIES OVER JOINS

(75) Inventors: Josephine Miu Cheng; Jyh-Herng Chow, both of San Jose; Michael Leon Pauser, Morgan Hill, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/375,259

(22) Filed: Aug. 16, 1999

(51) Int. Cl.$^7$ ............................................. G06F 17/30
(52) U.S. Cl. ........................... 707/4; 345/440; 345/775; 345/848
(58) Field of Search ................. 707/10, 4, 5, 2, 707/3; 345/440, 775, 848; 705/10; 706/12; 382/162

(56) References Cited

U.S. PATENT DOCUMENTS

| | | | |
|---|---|---|---|
| 5,421,008 A | | 5/1995 | Banning et al. |
| 5,428,776 A | * | 6/1995 | Rothfield et al. ............... 707/4 |
| 5,808,612 A | * | 9/1998 | Merrick et al. ............... 345/351 |
| 5,894,311 A | * | 4/1999 | Jackson ....................... 345/440 |
| 5,956,720 A | * | 9/1999 | Fernandez et al. ............ 707/10 |
| 5,999,192 A | * | 12/1999 | Selfridge et al. ............ 345/440 |
| 6,151,601 A | * | 11/2000 | Papiemiak et al. ........... 707/10 |

OTHER PUBLICATIONS

D.A. Keim, et al; Database Issues For Data Visualization, *IEEE Visualization*, (93 Workshop Proceedings, pp. 210–229, Berlin, Germany 1994).

* cited by examiner

*Primary Examiner*—John Breene
*Assistant Examiner*—Mohammad Ali
(74) *Attorney, Agent, or Firm*—Gates & Cooper LLP

(57) ABSTRACT

A method, apparatus, and article of manufacture for data visualization of queries over joins. One or more commands are executed in a computer to perform a database operation on a relational database stored on a data store connected to the computer. Initially, a selection of a join indicator associated with a row of a table in the relational database is received. It is determined whether to perform a table level join operation or a row level join operation. The determined join operation is performed.

30 Claims, 6 Drawing Sheets

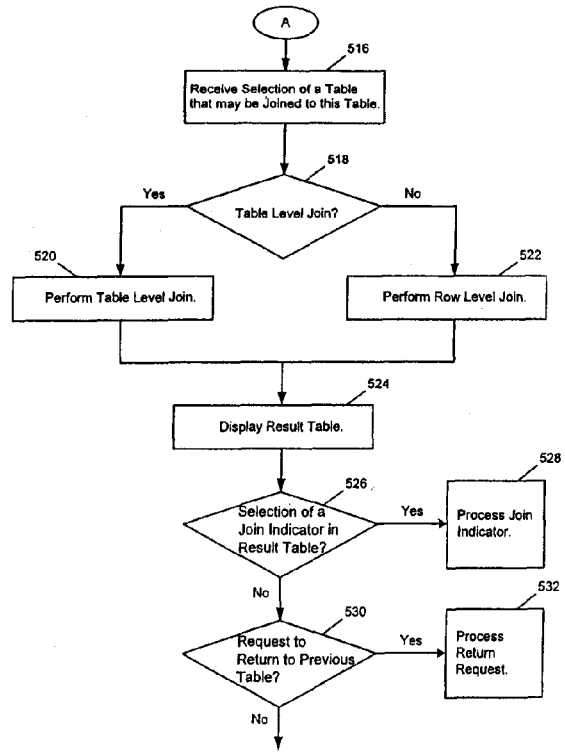

DEPARTMENT TABLE 200

| % (202) | DEPT NUMBER (204) | DEPT NAME (206) |
|---|---|---|
| % (210) | | (208) |
| % (214) | DRY | Database Technology Institute (212) |
| % | WET | Application Technology Institute |

EMPLOYEE TABLE 220

| % (222) | EMPLOYEE DEPARTMENT (224) | EMPLOYEE NAME (226) | EMPLOYEE ADDRESS (228) |
|---|---|---|---|
| % | DRY | JO | XXX |
| % | WET | MICHAEL | YYY |
| % | DRY | JH | ZZZ |

PROJECT TABLE 240

| % (242) | PROJECT DEPARTMENT (244) | PROJECT NAME (246) | PROJECT MEMBERS (248) |
|---|---|---|---|
| % | WET | ABC | ... |
| % | WET | SRT | ... |
| % | WET | XYZ | ... |

FIG. 2

RESULT TABLE - TABLE LEVEL JOIN / 300

| % | DEPT IDENTIFIER | DEPT NAME | EMPLOYEE DEPARTMENT | EMPLOYEE NAME | EMPLOYEE ADDRESS |
|---|---|---|---|---|---|
| % | DRY | Database Technology Institute | DRY | JO | XXX |
| % | DRY | Database Technology Institute | DRY | JH | ZZZ |
| % | WET | Application Technology Institute | WET | MICHAEL | YYY |

FIG. 3

RESULT TABLE - ROW LEVEL JOIN 400

| % | EMPLOYEE DEPARTMENT | EMPLOYEE NAME | EMPLOYEE ADDRESS |
|---|---|---|---|
| % | DRY | JO | XXX |
| % | DRY | JH | ZZZ |

FIG. 4